R. WASKEY.
Smut Mill.
No. 10,052.  Patented Sept. 27, 1853.
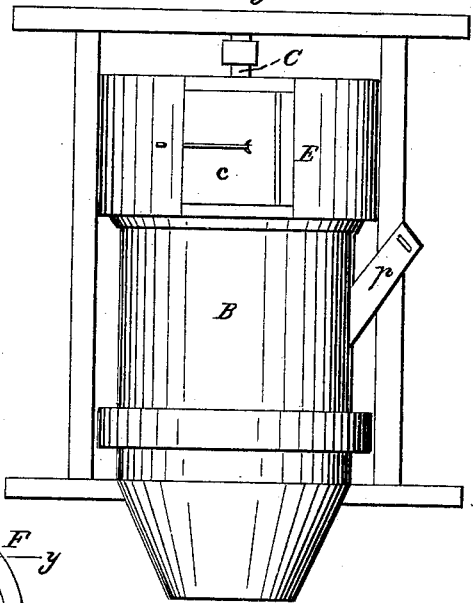
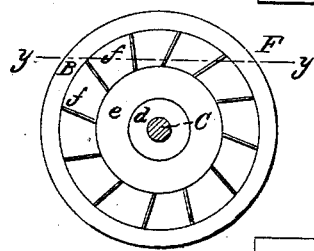
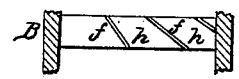
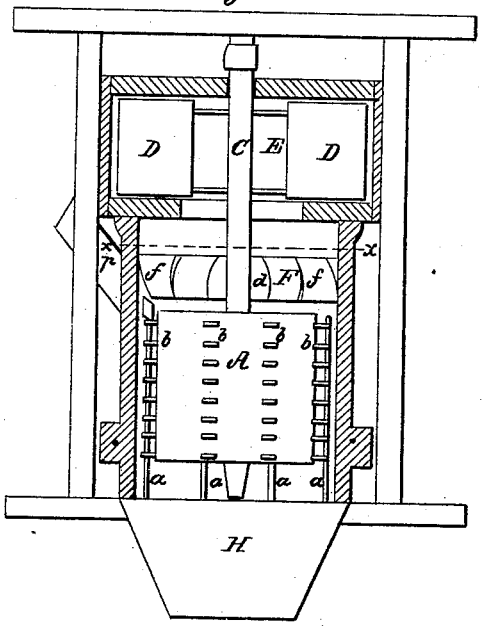

UNITED STATES PATENT OFFICE.

ROBERT WASKEY, OF MILL CREEK, VIRGINIA.

SMUT-MACHINE.

Specification of Letters Patent No. 10,052, dated September 27, 1853.

*To all whom it may concern:*

Be it known that I, ROBERT WASKEY, of Mill Creek, in the county of Botetourt and State of Virginia, have invented a new and useful Improvement in Smut-Machines; and I do hereby declare that the following is a full, clear, and exact description of the construction and operation of the same, reference being had to the annexed drawings, forming part of this specification, in which—

Figure 1 is a rear elevation of the machine. Fig. 2 is a vertical section through the axis of the machine. Fig. 3 is a horizontal section upon the line $x$ $x$ of Fig. 2. Fig. 4 is a vertical section upon the line $y$ $y$ of Fig. 3.

Similar letters of reference in the several figures denote the same part of the machine.

My invention consists in inserting between the head of the beating cylinder and the fan chamber, a diaphragm with inclined openings, for the purpose of preventing the grain from being carried off with the smut by the action of the blast during the operation of cleaning.

In the drawings A is the beating cylinder, revolving in the chamber B, and having its surface armed with the beaters $b$. On the sides of the chamber B are the ribs $a$, which with the beaters $b$ form the portion of the machine which loosens the smut from the grain.

C is the shaft which holds the fan D and cylinder A, the former revolving in the chamber E, which is furnished with the door $c$ for graduating the amount of draft. Between the fan chamber E and the head of the cylinder A is the diaphragm F having the opening $d$ in the center for the passage of the shaft C, and between the ring $e$ and sides of the chamber B the inclined partitions $f$, forming the openings $h$. Below the chamber B is the hopper H open at the bottom, through this opening enters the supply of air to fill the vacuum created by the fan.

The operation of my machine is as follows: The grain to be cleaned enters the machine by the channel $p$ and falling between the cylinder A and sides of the chamber B is submitted immediately to the action of the ribs $a$ and beaters $b$, which by the revolution of the cylinder A strip the smut from the grain, while the current created by the revolution of the fan D carries off the detached impurities and permits the cleaned grain to fall through the hopper H. The inclined openings in the diaphragm F allow the free passage of the air carrying the light smut, but prevent the passage of grain which the strong draft would be likely to carry off; as the grain would strike one of the partitions $f$, impeding its progress and permitting its gravity to roll it back into the chamber B. The door $c$ of the fan chamber regulates the draft, by the increase or diminution of the opening of the fan chamber as the occasion requires.

What I claim as my invention and desire to secure by Letters Patent, is—

The construction of the diaphragm F, the central part being solid, and that near the periphery made in several oblique valvular passages, to check and throw back the kernels of grain, as represented in Fig. 3 of the drawing.

In testimony whereof, I have hereunto signed my name before two subscribing witnesses.

ROBERT WASKEY.

Witnesses:
WM. P. ELLIOT,
ROBT. M. WADE.